United States Patent [19]

Iwata et al.

[11] Patent Number: 6,040,919
[45] Date of Patent: Mar. 21, 2000

[54] READING-RECORDING APPARATUS HAVING A LID MEMBER WHICH SERVES AS A PAPER GUIDE

[75] Inventors: Naohiro Iwata, Yokosuka; Katsumi Obana, Funabashi; Hideyuki Terashima, Sagamihara; Noriyuki Aoki, Tokyo, all of Japan

[73] Assignee: Canon Kabushiki Kaisha, Tokyo, Japan

[21] Appl. No.: 08/928,459

[22] Filed: Sep. 12, 1997

[51] Int. Cl.[7] .............................. H04N 1/00; H04N 1/04; G03G 15/00

[52] U.S. Cl. ..................... 358/400; 358/498; D14/118; 399/393; 399/405

[58] Field of Search ................................... 358/400, 496, 358/498, 296; 395/101, 106, 111; D14/118; 399/2, 388, 393, 397, 405; 347/2, 3, 104

[56] References Cited

U.S. PATENT DOCUMENTS

| D. 345,155 | 3/1994 | Hiroki et al. ........................... D14/118 |
| 5,317,422 | 5/1994 | Fujimoto ................................. 358/476 |
| 5,379,121 | 1/1995 | Yamada et al. ......................... 358/400 |
| 5,420,701 | 5/1995 | Terashima et al. ..................... 358/498 |
| 5,448,374 | 9/1995 | Yokoyama et al. ..................... 358/400 |
| 5,523,858 | 6/1996 | Yamada et al. ......................... 358/412 |
| 5,706,101 | 1/1998 | Yokoyama et al. ..................... 358/400 |
| 5,737,097 | 4/1998 | Fujimoto ................................. 358/498 |

FOREIGN PATENT DOCUMENTS

| 297566A2 | 1/1989 | European Pat. Off. . |
| 685958A2 | 12/1995 | European Pat. Off. . |
| 2656181 | 6/1991 | France . |
| 2278344 | 11/1994 | United Kingdom . |

*Primary Examiner*—Kimberly A. Williams
*Attorney, Agent, or Firm*—Fitzpatrick Cella Harper & Scinto

[57] ABSTRACT

A reading recording apparatus such as a facsimile apparatus is provided with a reading portion which causes an original conveying path to convey an original and reading image information, and a recording portion which causes a recording sheet conveying path to convey a recording sheet and effecting recording thereon, wherin an operating portion is disposed on the upper surface of an apparatus body, a lid member is provided openably and closably relative to the apparatus body, with the lid member, when in its closed position, covering the operating portion, and when in its opened position, supporting the original and the recording sheet so as to be guided by the original conveying path and the recording sheet conveying path, whereby the reading-recording apparatus has a well-balanced and compact structure.

10 Claims, 6 Drawing Sheets

READING-RECORDING APPARATUS HAVING A LID MEMBER WHICH SERVES AS A PAPER GUIDE

BACKGROUND OF THE INVENTION

1. Field of the Invention

This invention relates to a reading-recording apparatus such as a facsimile apparatus provided with a reading portion for causing an original conveying path to convey an original and reading image information and a recording portion for causing a recording sheet conveying path to convey a recording sheet and effecting recording thereon.

2. Related Background Art

For example, a facsimile apparatus as a reading-recording apparatus is shown in FIG. 6 of the accompanying drawings.

That is, a bundle of originals 52 inserted through an original insertion port 51 are separated one by one by an original separating portion 55 comprising an original separating roller 53 and an original separative piece 54 and are conveyed on an original conveying path 56, and arrive at an image information reading position 58 on a reading portion 57. The original 59 having arrived at the image information reading position 58 is conveyed by an original conveying roller 60 rotated in a direction for conveying the original 59 while having its image information read by the reading portion 57. The original 59 is discharged out of the apparatus through an original discharge port 61 by the original conveying roller 60.

A bundle of recording sheets 63 placed on a recording sheet supporting table 62 are separated one by one by a recording sheet separating roller 64. The recording sheet 65 separated by the recording sheet separating roller 64 is conveyed to a recording sheet conveying roller 66 disposed in opposed relationship with a recording sheet conveying path, and is further conveyed to an image recording position 67 by the recording sheet conveying roller 66, and the conveyance of the recording sheet 65 is stopped once at this position and the recording sheet 65 is held at this image recording position 67. At the image recording position 67, ink is discharged from the discharge port of an ink jet recording head 68 disposed in an opposed relationship with the image recording surface of the recording sheet 65, and ink droplets adhere to the image recording surface of the recording sheet 65, whereby an image is formed. When image recording corresponding to one line is terminated, the recording sheet conveying roller 66 is again rotated, whereby the recording sheet 65 is conveyed, and when the recording sheet 65 is conveyed by a predetermined amount, the conveyance of the recording sheet 65 is again stopped, and image recording on the next line is effected. When image recording corresponding to one page is terminated by the above-described process being repeated, the recording sheet 65 is discharged from the apparatus by a pair of recording sheet discharge rollers 69a and 69b disposed at positions opposed to each other relative to the recording sheet conveying path, and is placed near the discharge port outside the apparatus with its image recording surface facing upward.

In the above-described facsimile apparatus according to the prior art, however, the original reading portion is disposed above the recording portion to thereby provide a vertically placing configuration and therefore, as a matter of course, the vertical thickness of the apparatus is large. Thus, an apparatus is desired which has a well-balanced structure.

SUMMARY OF THE INVENTION

It is an object of the present invention to solve the above-noted problem and to provide a reading-recording apparatus which is provided with a well-balanced structure and small thickness.

It is another object of the present invention to provide the apparatus with a lid member also serving as an original and recording sheet supporting table.

It is still another object of the present invention to prevent the flexure of the lid member when the lid member is closed.

Further objects of the present invention will become apparent from the following detailed description of a specific embodiment of the present invention.

DESCRIPTION OF THE PREFERRED EMBODIMENTS

An embodiment of the present invention will hereinafter be described with reference to the drawings.

Figure 1:
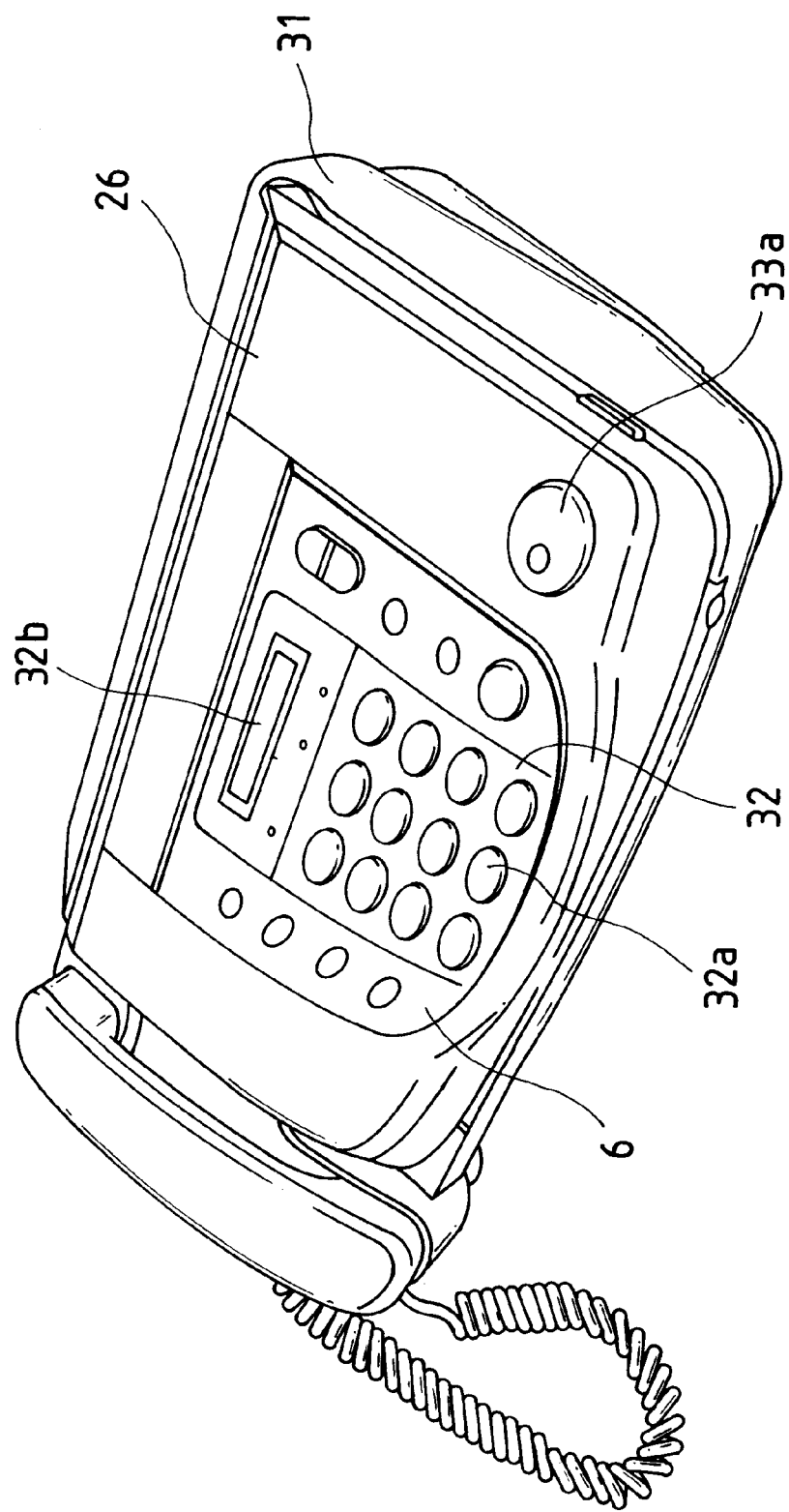
FIG. 1 is a pictorial perspective view of a reading-recording apparatus according to a first embodiment of the present invention.

FIG. 1 is a perspective view showing the appearances of a facsimile apparatus as a reading-recording apparatus according to a first embodiment of the present invention.

In FIG. 1, the reference numeral 31 designates an apparatus body on the upper surface of which an operating portion 6 is provided and an original and recording sheet supporting table 26 having a function as a lid member is disposed.

An operating panel portion 32 is on the central portion of the operating portion 6, and operating members such as a dial button 32a and a display portion 32b necessary when a telephone operation is performed are disposed on this operating panel portion 32. A group of various operating buttons 33 used during original transmission and during copying are further disposed on the operating portion 6. The operating buttons other than a fax button 33a lie at a location covered with the original and recording sheet supporting table 26.

Figure 2:
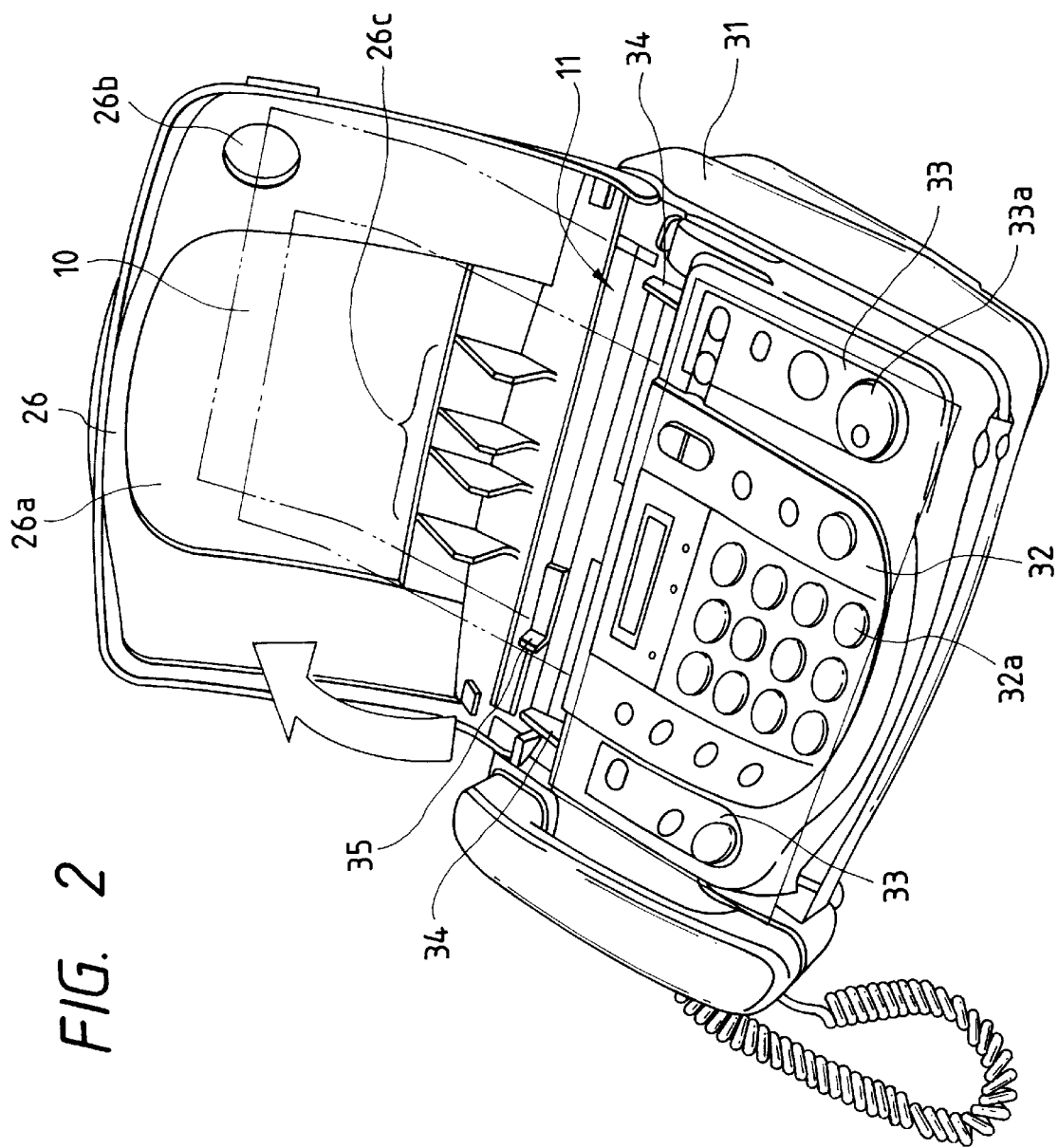
FIG. 2 is a perspective view of the reading-recording apparatus of FIG. 1 when the lid member thereof is opened.

FIG. 2 shows the apparatus body 31 with the original and recording sheet supporting table 26 as the lid member of the apparatus body 31 opened, and a recording sheet insertion port 11 is disposed rearwardly of the upper surface of the apparatus body 31 when the original and recording sheet supporting table 26 is opened, and an original insertion port 2 is disposed on this side thereof.

The reference numeral 34 denotes a pair of original guides slidable within a predetermined range in the widthwise direction of the original to widen and narrow the original insertion port 2, and the reference numeral 35 designates a recording sheet guide slidable in the widthwise direction of the recording sheet to widen and narrow the recording sheet insertion port 11. The original guide 34 and the recording sheet guide 35 are of a shape readily operable by a user.

The original and recording sheet supporting table 26 is mounted so as to be pivotally moved openably and closably with the vicinity of the recording sheet insertion port 11 as a fulcrum, and this original and recording sheet supporting table 26 is openable and closable between an opened position obliquely upwardly extending rearwardly of the recording sheet insertion port 11 and a closed position covering the upper surface of the apparatus body 31. Also, the original and recording sheet supporting table 26 is of a curved shape fitted for the upper surface of the apparatus body 31 and has a length substantially reaching the fore end of the upper surface of the apparatus body 31 and has cut-aways 26a and 26b for exposing the operating panel portion 32 and the fax button 33a.

Accordingly, in a state in which as shown in FIG. 1, the original and recording sheet supporting table 26 covers the upper surface of the apparatus body 31, the operating panel portion 32 and the fax button 33a are exposed, but almost all the other portions are covered. The operating panel portion 32 and the fax button 33a are formed so as to be protuberant relative to the surroundings thereof, and with the original and recording sheet supporting table 26 covering the surroundings thereof, the upper surface of the original and recording sheet supporting table 26 and the upper surface of the operating panel portion 32 are flush with each other. If such a construction is adopted, advantages will be obtained such as good appearances and ease of cleaning.

Further, several ribs 26c are provided on the original and recording sheet supporting table 26, and are constructed into the shape of a guide for rectilinearly guiding an original 1 or a recording sheet 14 (see FIG. 4) relative to an original conveying path or a recording sheet conveying path 16 when the original and recording sheet supporting table 26 is in its opened position. Also, these ribs 26c are of a shape which escape from the recording sheet guide 35 when the original and recording sheet supporting table 26 is in its closed position, and are disposed at a location whereat they do not interfere with the original guides 34 (that is, the ribs 26a are provided more inwardly of the slidable innermost position of the original guides 34 on the opposite sides). Further, when the original and recording sheet supporting table 26 is in its closed position, if the original and recording sheet supporting table 26 is pressed from above it, the ribs 26c will strike against the upper surface of the apparatus body to thereby provide a flexure preventing stopper.

Figure 3:
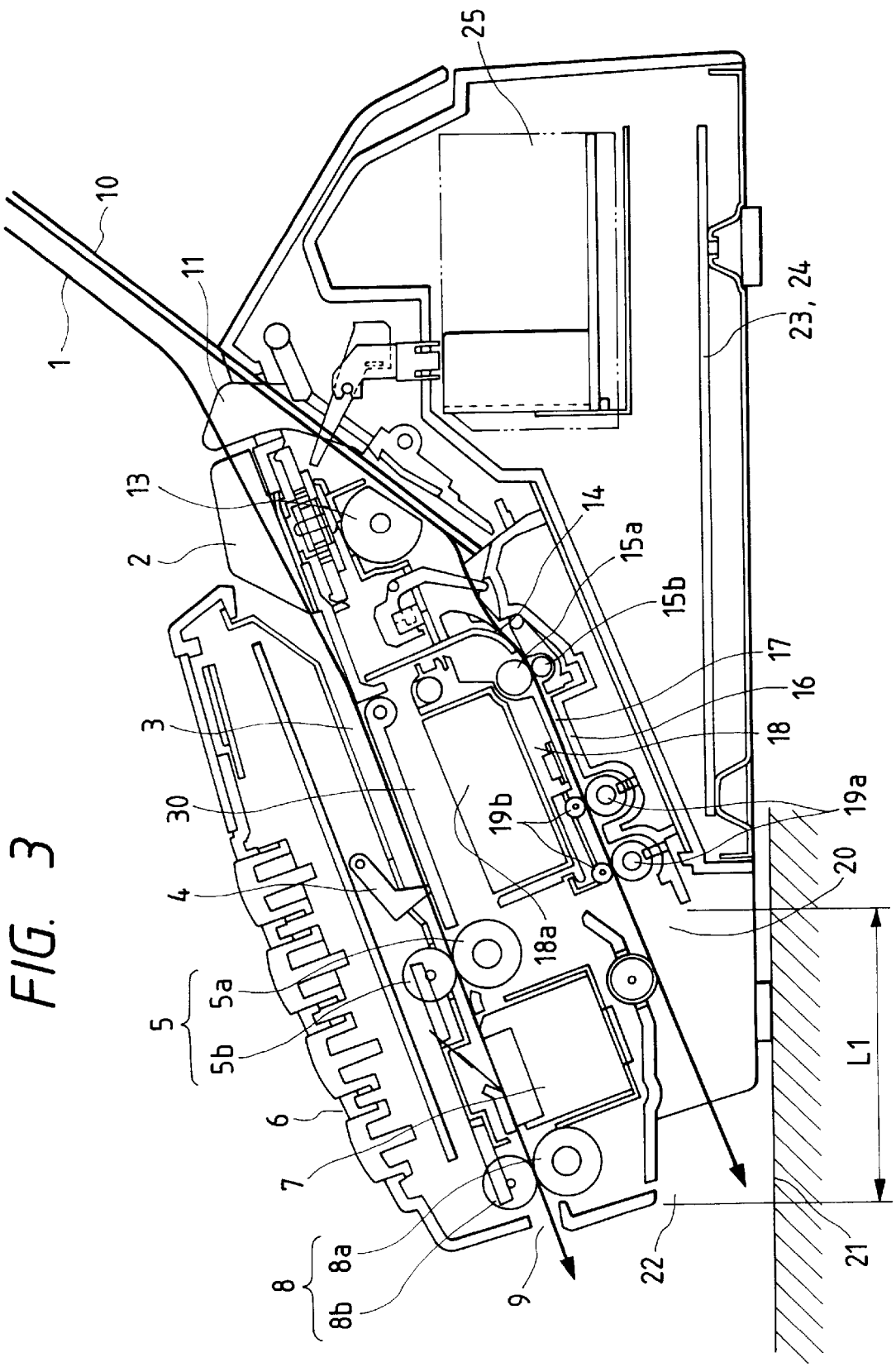
FIG. 3 is a cross-sectional view of the reading-recording apparatus shown in FIG. 1.

The internal construction of the apparatus body will now be described with reference to FIG. 3. In FIG. 3, the reference numeral 1 designates an original sheet which is conveyed from the original insertion port 2 disposed above the rear portion of the apparatus body to the original conveying path 3. The reference numeral 10 denotes a bundle of recording sheets set on the supporting table, and as regards the bundle of recording sheets 10, recording sheets 14 separated one by one from the recording sheet insertion port 11 disposed above the rear portion of the apparatus body are conveyed to a recording sheet conveying path 16. The original conveying path 3 and the recording sheet conveying path 16 are substantially parallel to each other. As described above, the original insertion port 2 and the recording sheet insertion port 11 are both disposed above the rear portion of the apparatus body, and an original discharge port 9 and a second recording sheet carry-out port 22 are disposed forwardly. Therefore, the operability of the original sheet 1 and the recording sheet 14 becomes good. In the original conveying path 3, an original presence detecting sensor 4, original supply rollers 5a and 5b, the reading portion 7 of a reading sensor and original discharge rollers 8a and 8b are provided from the original insertion port 2 side toward the original discharge port 9. In the recording sheet conveying path 16, a recording sheet separating roller 13, recording sheet conveying rollers 15a and 15b, the recording portion 18 of an ink jet recording head and recording sheet discharge rollers 19a and 19b are provided from the recording sheet insertion port 11 side toward a first recording sheet discharge port 20.

The original conveying path 3 has an inclination of about 20° with respect to the horizontal and the original conveying upstream side thereof is disposed above the downstream side thereof.

Also, the ribs 26c of the original and recording sheet supporting table 26 are of a shape which guides the original 1 so as to rectilinearly move relative to the original conveying path 3 and therefore, the original 1 is substantially rectilinearly moved along the original conveying path 3. Therefore, the direction of conveyance of the original is a direction utilizing gravity and thus, a stable original conveying property can be realized.

Also, the recording sheet conveying path 16 is disposed on the lower side relative to the original conveying path 3, is substantially parallel to the original conveying path 3, and has an inclination of about 20° with respect to the horizontal, and the recording sheet conveying upstream side thereof is disposed above the downstream side thereof.

Also, the ribs 26c of the original and recording sheet supporting table 26 is of a shape which guides the recording sheet 14 so as to move rectilinearly relative to the recording sheet conveying path 16 and therefore, the recording sheet 14 may be substantially moved rectilinearly along the recording sheet conveying path 16. Accordingly, the direction of conveyance of the recording sheet is a direction utilizing gravity and thus, a stable recording sheet conveying property can be realized.

The inclination of the original conveying path 3 and the recording sheet conveying path 16 is about 20°, whereby both of the stable conveying property for the original and the recording sheet utilizing gravity and making the thickness of the entire apparatus small are well-balancedly achieved.

Also, the reading portion 7 is disposed below the original conveying path 3 and the recording portion 18 of the ink jet recording head is disposed above the recording sheet conveying path 16. That is, the reading portion 7 and the recording portion 18 of the ink jet recording head are disposed in a space portion 30 sandwiched between the original conveying path 3 and the recording sheet conveying path 16 which are substantially parallel to each other. Accordingly, the reading portion 7 and the recording portion 18 of the ink jet recording head are disposed on the opposite sides of the space portion, and the ink cartridge 18a of the recording portion 18 is disposed in the space portion 30 so as to be along the recording sheet conveying path. The reading portion 7 is disposed on the downstream side in the direction of conveyance of the original and recording sheet, and the recording portion 18 of the ink jet recording head is disposed on the upstream side in the direction of conveyance of the original and recording sheet. Therefore, the dimension of the reading and recording portion in the direction of thickness can be made small, and this contributes greatly to the compactness of the entire apparatus. Also, the reading portion 7 is disposed on the downstream side in the direction of conveyance of the original and recording sheet, i.e., forwardly of the apparatus body, and therefore, maintenance such as the cleaning of the reading portion can be easily done. Also, the recording portion 18 of the ink jet recording head is disposed on the upstream side in the direction of conveyance of the original and recording sheet and therefore, the image recording position 17 is disposed in the central portion in the longitudinal direction of the apparatus as viewed in the entire apparatus, and the first recording sheet discharge port 20 is disposed rearwardly at a predetermined distance L1 from the front face of the apparatus. Consequently, the recording sheet 14 is discharged from the apparatus through the first recording sheet discharge port 20 by the pair of recording sheet discharge rollers 19a and 19b, whereafter it is conveyed by L1 on a flow surface 21 on which the apparatus is placed, by the pair of recording sheet discharge rollers 19a and 19b, and thereafter is discharged to the outside of the apparatus supporting surface through the second recording sheet discharge port 22 in the front face of the apparatus. Therefore, when the recording sheet 14 has been discharged to the outside of the apparatus supporting surface, the ink printed on the recording sheet 14 at the image recording position 17 is sufficiently fixated.

Also, since the recording portion 18 of the ink jet recording head is disposed above the recording sheet conveying path 16, the ink is discharged downwardly from the recording portion 18 of the ink jet recording head toward the recording sheet 14 and therefore, printing accuracy becomes good, and this means the optimum layout for the ink jet recording apparatus.

Electrical parts such as a system control substrate 23, a telephone circuit control substrate 24 and a power source unit 25 are disposed below on the upstream side of the recording sheet conveying path 16. Also, the operating portion 6 of the apparatus body is disposed above on the downstream side of the original conveying path 3. By doing so, the operating portion 6 to be operated by a user is disposed on the upper surface of this side of the apparatus body, and electrical parts such as the system control substrate 23, the telephone circuit control substrate 24 and the power source unit 25 which are rarely touched by the user are disposed on the lower surface of the rear of the apparatus body, and this is a layout which has realized both of operability and compactness as the whole of the apparatus.

The conveying operations for the original and the recording sheet will now be described. The original sheet 1 is set from the original insertion port 2 disposed above the rear portion of the apparatus body onto the original conveying path 3, and a signal is sent from an original presence detecting sensor 4 schematically shown to the control portion of the apparatus, which thus recognizes that the original is present. After a predetermined time T1 has elapsed thereafter, the original supply roller 5a is rotated at a predetermined number of revolutions S1. The predetermined time T1 is adjusted so as to be substantially equal to the time required for the original sheet 1 operated by the user of the apparatus to arrive at an original supply roller portion 5 comprising the original supply rollers 5a and 5b from the original presence detecting sensor 4. Design is made such that substantially simultaneously with the rotation of the original supply roller 5a, setting sound rumbles from the apparatus to thereby inform the user that the original has been normally set. Also, the predetermined number of revolutions S1 at which the original supply roller 5a is rotated is adjusted to a number of revolutions for which the user can recognize without a feeling of physical disorder that the original has been normally set on the apparatus and has been normally nipped by the original supply roller portion. By a key on the operating portion 6 being depressed, the original supply roller 5a and the original discharge roller 8a are rotated to thereby convey the original sheet 1. The original sheet 1 has its image information read by the reading portion 7 disposed below the original conveying path 3 while being conveyed by the original supply roller portion 5 and the original discharge roller portion 8 comprising the original discharge rollers 8a and 8b, and is discharged out of the apparatus through the original discharge port 9 by the original discharge roller portion 8.

On the other hand, a bundle of recording sheets 10 are set from the recording sheet insertion port 11 disposed above the rear portion of the apparatus body onto the supporting table 26. The thus set bundle of sheets 10 are separated one by one by the recording sheet separating roller 13. The recording sheet 14 separated by the recording sheet separating roller 13 is conveyed to the pair of recording sheet conveying rollers 15a and 15b disposed in opposed relationship with the recording sheet conveying path, and the recording sheet 14 is further conveyed to the image recording position 17 along the recording sheet conveying path 16 by the pair of recording sheet conveying rollers 15a and 15b, and at this position, the recording sheet 14 is stopped once and is held at the image recording position 17. At the image recording position 17, ink is discharged from the discharge port of the recording portion 18 of the ink jet recording head disposed above the recording sheet conveying path 16, and ink droplets adhere to the image recording surface of the recording sheet 14, whereby an image is formed thereon. When image recording corresponding to one line is terminated, the pair of recording sheet conveying rollers 15a and 15b are again rotated, whereby the recording sheet 14 is conveyed, and when the recording sheet 14 is conveyed by a predetermined amount, the conveyance of the recording sheet 14 is again stopped, and the image recording of the next line is effected. By the above-described process being repeated, image recording corresponding to one page is terminated, whereupon the recording sheet 14 is discharged out of the apparatus through the first recording sheet discharge port 20 by the pair of recording sheet discharge rollers 19a and 19b disposed in opposed relationship with the recording sheet conveying path.

Figure 5:
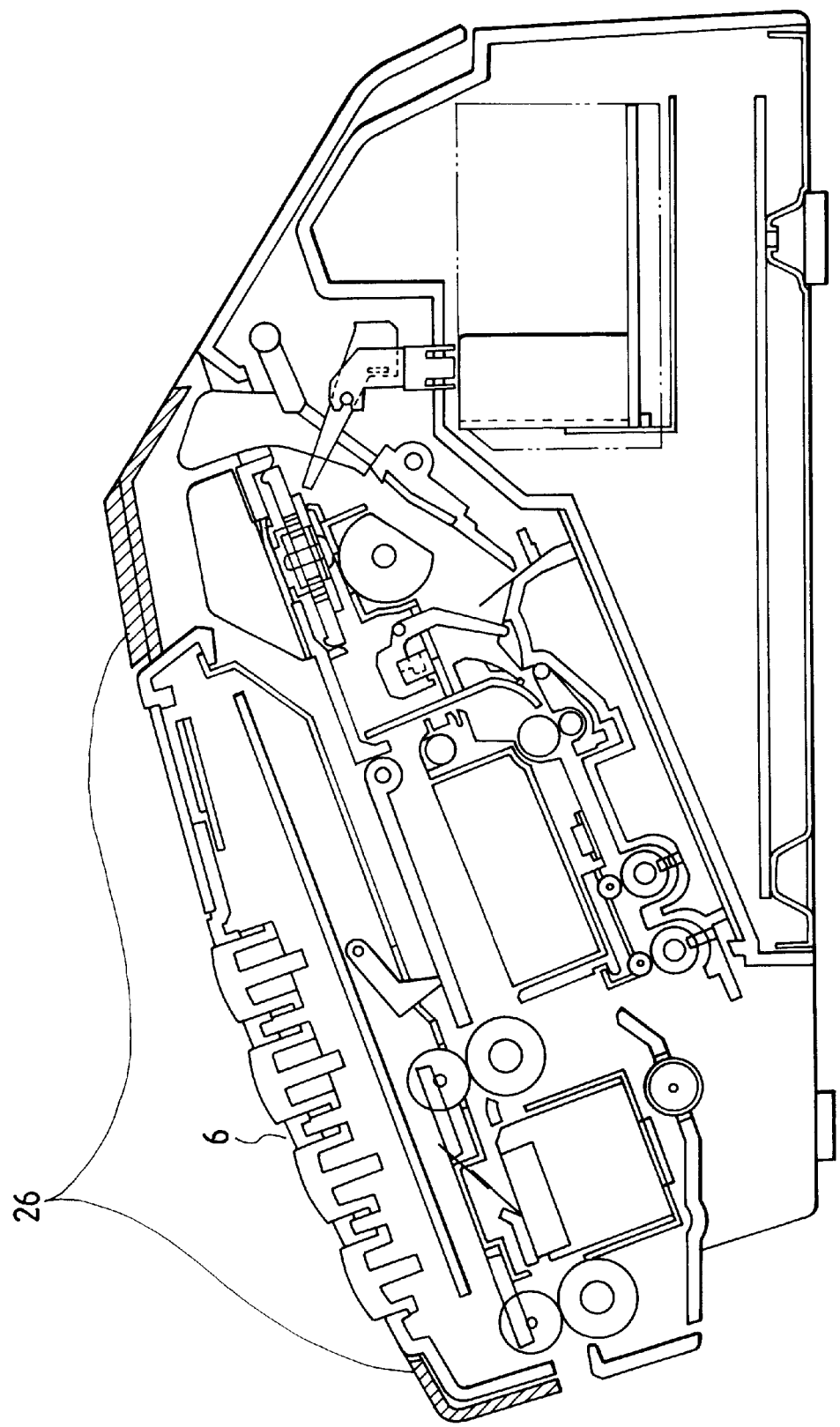
FIG. 5 is a cross-sectional view of the reading-recording apparatus shown in FIG. 3 when the lid member thereof is closed.
Figure 6:
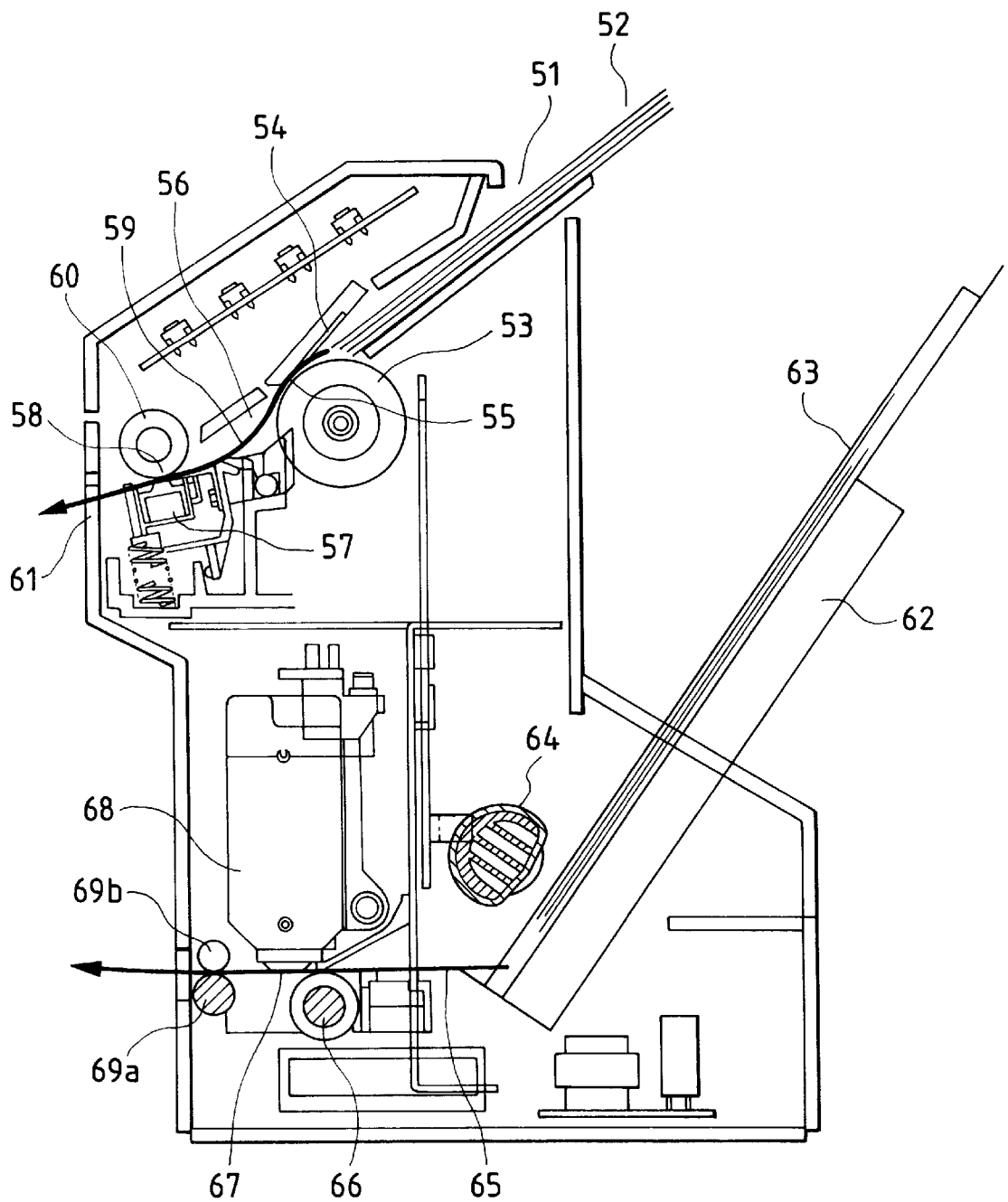
FIG. 6 is a cross-sectional view of a reading-recording apparatus according to the prior art.

Description will now be made of the operation of the facsimile apparatus constructed as described above. When the frequency of transmission and reception is small, the original and recording sheet supporting table 26 is brought into its closed position as shown in FIGS. 1 and 5. Thereby, almost the entire upper surface of the apparatus body 11 including the original insertion port 2 is covered with the original and recording sheet supporting table 26, whereby the entry of dust or the like from the outside is prevented. Also, the absence of a member protruding upwardly from the apparatus leads to the saving of the space. When a signal is received in this state, it is memory reception and the fax button 33a is turned on. Since the fax button 33a is exposed, the user can confirm that the apparatus is receiving a signal.

When this facsimile apparatus is simply used as a telephone set, the operating panel portion can be operated and dialed with the original and recording sheet supporting table 26 closed. Therefore, it is unnecessary to open the original and recording sheet supporting table 26 and the operation becomes simple and moreover, an incorrect operation is not performed because the group of operating buttons 33 not used except during transmission are covered with the convex portion of the original and recording sheet supporting table 26.

Figure 4:
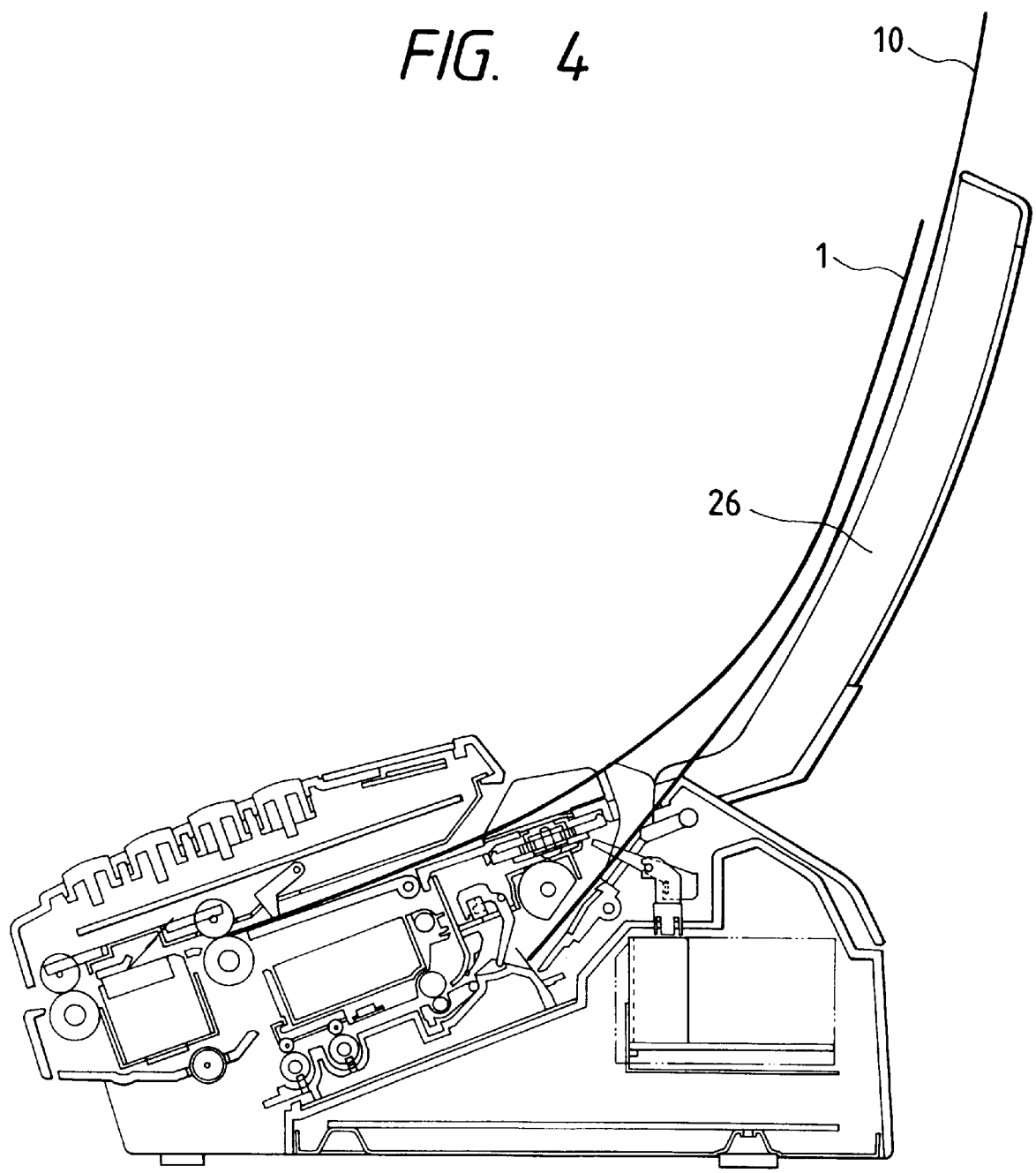
FIG. 4 is a cross-sectional view of the reading-recording apparatus shown in FIG. 3 when the lid member thereof is opened.

Next, when transmission is to be effected, the original and recording sheet supporting table 26 is opened to its position shown in FIGS. 2 and 4. When the original and recording sheet supporting table 26 is brought into its opened position, it assumes an obliquely standing state as shown in FIGS. 2 and 4, and the original is supported by the ribs 26c, whereby the original is fed in from the original insertion port and transmission can be effected. Likewise, when reception recording is to be effected, the original and recording sheet supporting table assumes an obliquely standing state, and the recording sheet is supported by the ribs 26c, whereby the original and recording sheet supporting table 26 substantially covers the entire surface of the apparatus body and therefore, the length thereof becomes great and thus, in the case of the opened position shown in FIG. 4, the height thereof is significant and accordingly, large originals and recording sheets can be stably supported. Although a cutaway 26a is formed in the central portion of the original and recording sheet supporting table, it constitutes no hindrance because the original and the recording sheet are supported by the ribs 26c.

As described above in detail, according to the present invention, in a reading-recording apparatus provided with a reading portion for causing an original conveying path to convey an original and reading image information, and a recording portion for causing a recording sheet conveying path to convey a recording sheet and effecting recording, an operating portion is disposed on the upper surface of the apparatus body, a lid member is provided openably and closably relative to the apparatus body, and the lid member, when in its closed position, covers the operating portion, and when in its opened position, supports the original and the recording sheet so as to be capable of being guided by the original conveying path and the recording sheet conveying path, and therefore the lid member can provide the function of a supporting table for the original and the recording sheet, and when in its closed position, can be disposed compactly.

The original conveying path and the recording sheet conveying path are formed in such a manner that their directions of sheet conveyance are the same and substantially parallel to each other, and a space portion is formed between the original conveying path and the recording sheet conveying path, and the reading portion is provided in the space portion on the downstream side in the direction of sheet conveyance and the recording portion is provided in the space portion on the upstream side in the direction of sheet conveyance, and the reading portion and the recording portion are disposed at a location sandwiched between the two conveying paths, whereby the reading-recording apparatus is made into one which has a well-balanced structure a whole and of which the thickness can be made small and which has a spatial saving property and has good operability. Also, according to the present invention, the downstream side of the original conveying path and the recording sheet conveying path is disposed below the upstream side and the direction of conveyance of the original and the direction of conveyance of the recording sheet are made obliquely downward, whereby gravity can be utilized for the conveyance of the original and the recording sheet to thereby effect stable conveyance and moreover, the original conveying path is disposed above and the recording sheet conveying path is disposed below, whereby the maintenance of the reading portion can be easily performed, and the distance from after recording has been effected on the recording sheet until the recording sheet is discharged can be secured to thereby improve the fixativeness of the ink on the recording sheet in the case of an ink jet recording head.

Also, according to the present invention, the ribs provided on the lid member, when the lid member is in its opened position, assume the shape of a guide for rectilinearly moving the original relative to the original conveying path and therefore, the original is guided to a correct position by the original conveying path. Also, when the lid member is in its closed position, if the lid member is pressed from above the apparatus, the ribs provided on the lid member provide a flexure preventing stopper striking against the upper surface of the apparatus body and therefore, it is possible to prevent the flexure and damage of the lid member.

Also, according to the present invention, the ribs provided on the lid member are disposed at a location whereat they do not interfere with the guide of the original and therefore, it is possible to perform the operation of closing the lid member without minding the original guide.

Also, according to the present invention, the ribs provided on the lid member, when the lid member is in its opened position, assume the shape of a guide for rectilinearly moving the original and the recording sheet relative to the original conveying path and the recording sheet conveying path and therefore, the original and the recording sheet are guided to right positions relative to the original conveying path and the recording sheet conveying path.

Also, according to the present invention, the ribs provided on the lid member are of a shape escaping from the recording sheet guide and therefore, it becomes possible to perform the operation of closing the lid member without concern for the recording sheet guide.

What is claimed is:

1. A reading-recording apparatus including:

an apparatus body;

an operating portion disposed on the upper surface of said apparatus body;

an original conveying path for conveying an original from above to forwardly of said apparatus body;

a recording sheet conveying path for conveying a recording sheet from above to forwardly of said apparatus body, with said recording sheet conveying path being arranged substantially parallel to said original conveying path in a same conveying direction to form a space portion between said recording sheet conveying path and said original conveying path;

a reading portion for causing said original conveying path to convey the original and reading image information therefrom, with said reading portion being provided on the space portion;

a recording portion for causing said recording sheet conveying path to convey the recording sheet and effecting recording thereon, with said recording portion being provided on the space portion adjacent to said reading portion; and said lid member, when in its closed position, covering said operating portion, and when in its opened position, supporting the original and the recording sheet so as to be guided by said original conveying path and said recording sheet conveying path.

2. A reading-recording apparatus according to claim 1, wherein said operating portion is disposed above the downstream side of said original conveying path.

3. A reading-recording apparatus according to claim 1, wherein said recording portion is an ink jet recording head, the ink cartridge of which is disposed in said space portion so as to be along said recording sheet conveying path.

4. A reading-recording apparatus according to claim 1, wherein said original conveying path is disposed above, and said recording sheet conveying path is disposed below.

5. A reading-recording apparatus according to claim 1, wherein said original conveying path and said recording sheet conveying path have their downstream side disposed below the upstream side and have their directions of sheet conveyance made obliquely downward.

6. A reading-recording apparatus according to claim 5, wherein the inclination of the directions of sheet conveyance of said original conveying path and said recording sheet conveying path with respect to the horizontal is about 20°.

7. A reading-recording apparatus according to claim 1, wherein said lid member has ribs for preventing the flexure of said lid member when said lid member when in its closed position is pressed.

8. A reading-recording apparatus according to claim 7, wherein said original conveying path and said recording sheet conveying path have an original insertion port provided with an original guide and a recording sheet insertion port provided with a recording sheet guide, respectively, and said ribs are provided at a location whereat they do not interfere with said guides when said lid member is in its closed position.

9. A reading-recording apparatus including:

an apparatus body;

an operating portion disposed on the upper surface of said apparatus body, said operating portion having an operating panel portion;

an original conveying path for conveying an original from above to forwardly of said apparatus body;

a recording sheet conveying path for conveying a recording sheet from above to forwardly of said apparatus body, with said recording sheet conveying path being arranged substantially parallel to said original conveying path in a same conveying direction to form a space portion between said recording sheet conveying path and said original conveying path; recording sheet conveying path and said original conveying path;

a reading portion for causing said original conveying path to convey the original and reading image information therefrom, with said reading portion being provided on the space portion;

a recording portion for causing said recording sheet conveying path to convey the recording sheet and effecting recording thereon, with said recording portion being provided on the space portion adjacent to said reading portion; and a lid member provided openably and closably relative to said apparatus body, said lid member, when in its closed position, covering said operating portion, and when in its opened position, supporting the original and the recording sheet so as to be guided by said original conveying path and said recording sheet conveying path, said lid member having a cut-away portion, said lid member, when in its closed position, covering said operating portion, but exposing said operating panel portion by said cut-away portion.

10. A reading-recording apparatus according to claim 9, which is a facsimile apparatus and wherein said lid member, when in its closed position, exposes said operating panel portion by said cut-away portion and said apparatus can function as a telephone set.

* * * * *

UNITED STATES PATENT AND TRADEMARK OFFICE
CERTIFICATE OF CORRECTION

PATENT NO.    : 6,040,919
DATED         : March 21, 2000
INVENTOR(S)   : NAOHIRO IWATA ET AL.

It is certified that error appears in the above-identified patent and that said Letters Patent is hereby corrected as shown below:

ON THE TITLE PAGE:

Insert: --[30] Foreign Application Priority Data

September 17, 1996 [JP] Japan........8-244844
October 11, 1996 [JP] Japan..........8-289288--;

[56] References Cited, under U.S. PATENT DOCUMENTS

"D.345,155" should read --D345155--; and under *Attorney, Agent, or Firm*

"Fitzpatrick, Cella Harper & Scinto" should read --Fitzpatrick, Cella, Harper & Scinto--; and

[57] ABSTRACT

Line 1, "reading recording" should read --reading-recording--.

UNITED STATES PATENT AND TRADEMARK OFFICE
CERTIFICATE OF CORRECTION

PATENT NO. : 6,040,919
DATED : March 21, 2000
INVENTOR(S) : NAOHIRO IWATA ET AL.

It is certified that error appears in the above-identified patent and that said Letters Patent is hereby corrected as shown below:

COLUMN 7:

Line 46, "a whole" should be deleted.

Signed and Sealed this

Tenth Day of April, 2001

Attest:

NICHOLAS P. GODICI

Attesting Officer

Acting Director of the United States Patent and Trademark Office